United States Patent [19]

Finkel

[11] Patent Number: 4,647,144

[45] Date of Patent: Mar. 3, 1987

[54] OPTICAL SCANNER

[75] Inventor: Mitchell W. Finkel, Silver Spring, Md.

[73] Assignee: The United States of America as represented by the Administrator of the National Aeronautics and Space Administration, Washington, D.C.

[21] Appl. No.: 606,432

[22] Filed: May 2, 1984

[51] Int. Cl.⁴ ............................................. G02B 26/08
[52] U.S. Cl. ................................................... 350/6.5
[58] Field of Search ..................... 250/235, 236, 578; 346/109; 350/6.3, 6.5, 6.6, 6.7, 6.8, 6.9, 6.91, 486, 622; 355/8; 358/208, 285, 293

[56] References Cited

U.S. PATENT DOCUMENTS

| | | | |
|---|---|---|---|
| 3,537,795 | 11/1970 | Clerc | 356/51 |
| 4,053,763 | 10/1977 | Harney | 250/578 |
| 4,215,912 | 8/1980 | Minoura | 350/6.91 |
| 4,299,438 | 11/1981 | Minoura | 350/6.6 |
| 4,348,109 | 9/1982 | Auterson | 350/6.91 |

Primary Examiner—John K. Corbin
Assistant Examiner—Vincent J. Lemmo
Attorney, Agent, or Firm—John O. Tresansky; John R. Manning; Harry Lupuloff

[57] ABSTRACT

An optical scanner for imaging lines in an object plane (10) onto a linear array (18) in a focal plane (16) either continuously or discretely and comprising a set of four mutually perpendicularly oriented plane corner mirrors (28, 30, 32, 34) providing a reflecting path ($L_1$, $L_2$, $L_3$, $L_4$, $L_5$) describing a parallelogram and a plane parallel scanning mirror (22) with a front and back reflecting surface ($M_o$, $M_{oo}$) located mid-way between the first and fourth corner mirrors (28, 34) and oriented so that in the mid scan position (45°) it is parallel to the first corner mirror (28) and therefore perpendicular to the fourth corner mirror (34). As the scan mirror (22) rotates, rays ($L_o$, $L_i$) incident from a plurality of lines (15, 17) in the object plane (10) are selectively directed through the optical system arriving at a common intersection ($P_{oo}$) on the back surface ($M_{oo}$) of the scanning mirror where the rays are colinearly directed ($L_i$) toward a lens (14) and then imaged onto the linear array (18) in the focal plane (16). A set of compensating mirrors ($M_5$, $M_6$, $M_7$, $M_8$) may be introduced just before the imaging lens (14) to compensate for a small and generally negligible path difference $\Delta_l$ between the axial ($L_o$) and marginal ($L_i$) rays.

9 Claims, 6 Drawing Figures 4,647,144

OPTICAL SCANNER

ORIGIN OF THE INVENTION

The invention described herein was made by an employee of the United States Government and may be manufactured and used by or for the Government for governmental purposes without the payment of any royalties thereon or therefor.

TECHNICAL FIELD

This invention relates generally to an optical scanning system and more particularly to an optical scanner for imaging a plurality of lines in the object plane onto a linear array in a focal plane.

BACKGROUND ART

Optical scanning systems are well known in the art. Reflective, prism, cylindrical drum and X-Y scanners are representative of some of the more important classes of optical scanners. Scanning systems comprising corner mirrors and a scanning mirror are also known. While such devices may satisfy their design criteria, certain limitations have been observed. Some do not instantaneously read out a line, some are subject to radiometric errors such as the $\cos^4\theta$ fall-off, some operate in either a reflecting or transmitting mode, some will not accept plane targets, some require linear translation, and in others, image fidelity is not optimum.

STATEMENT OF THE INVENTION

Accordingly, it is an object of this invention to provide an optical scanner that is fully compatible with the requirements of linear arrays.

It is a further object of this invention to provide an optical scanner which will image lines in the object plane onto a linear array in the focal plane.

It is another object of this invention to provide a scanner which provides scans which are linear with respect to scan angle.

Still another object of this invention is to provide an optical scanner that is virtually free of aberrations and radiometric errors.

It is yet another object of this invention to provide an optical scanner which minimizes problems associated with angular dependence such as reflectance and polarization.

Still a further object of this invention is to provide an optical scanner that can accept either plane transmitting or reflecting targets, slits or knife edges.

Yet a further object of this invention is to provide an optical scanner which facilitates the determination of the modulation transfer function and the velocity dependent transfer function.

Briefly, the foregoing and other objects are achieved by means of an optical scanner which images lines in the object plane onto a linear array in a focal plane wherein all of the optical components with the exception of an imaging lens are comprised of plane mirrors and include a set of four mutually perpendicularly oriented corner mirrors and a plane parallel scanning mirror located on a line midway between the first and fourth corner mirror and oriented so that at the mid-scan position it is at 45° with respect to the object plane. As the scan mirror rotates the normal components of the scenes or target radiance is reflected by the front surface of the scan mirror and directed by the corner mirrors along a path describing a parallelogram arriving at a common intersection on the back surface of the scan mirror. Since the angle of incidence on the front and back surface of the scan mirror must be identical, it follows that all the emergent rays are colinear. The scanning system is followed by a lens which images the emergent rays onto a linear array in the focal plane. Continuous or discrete rotation of the scan mirror is provided by a motor coupled to the scan mirror. A set of compensating mirrors can be introduced along the optical path just before the imaging lens which effectively cancels the small path difference between the axial and marginal rays.

The foregoing as well as other objects, features and advantages of the invention will become apparent from the following detailed description when taken in conjunction with the accompanying drawings.

DETAILED DESCRIPTION OF THE INVENTION

Figures 1, 5:
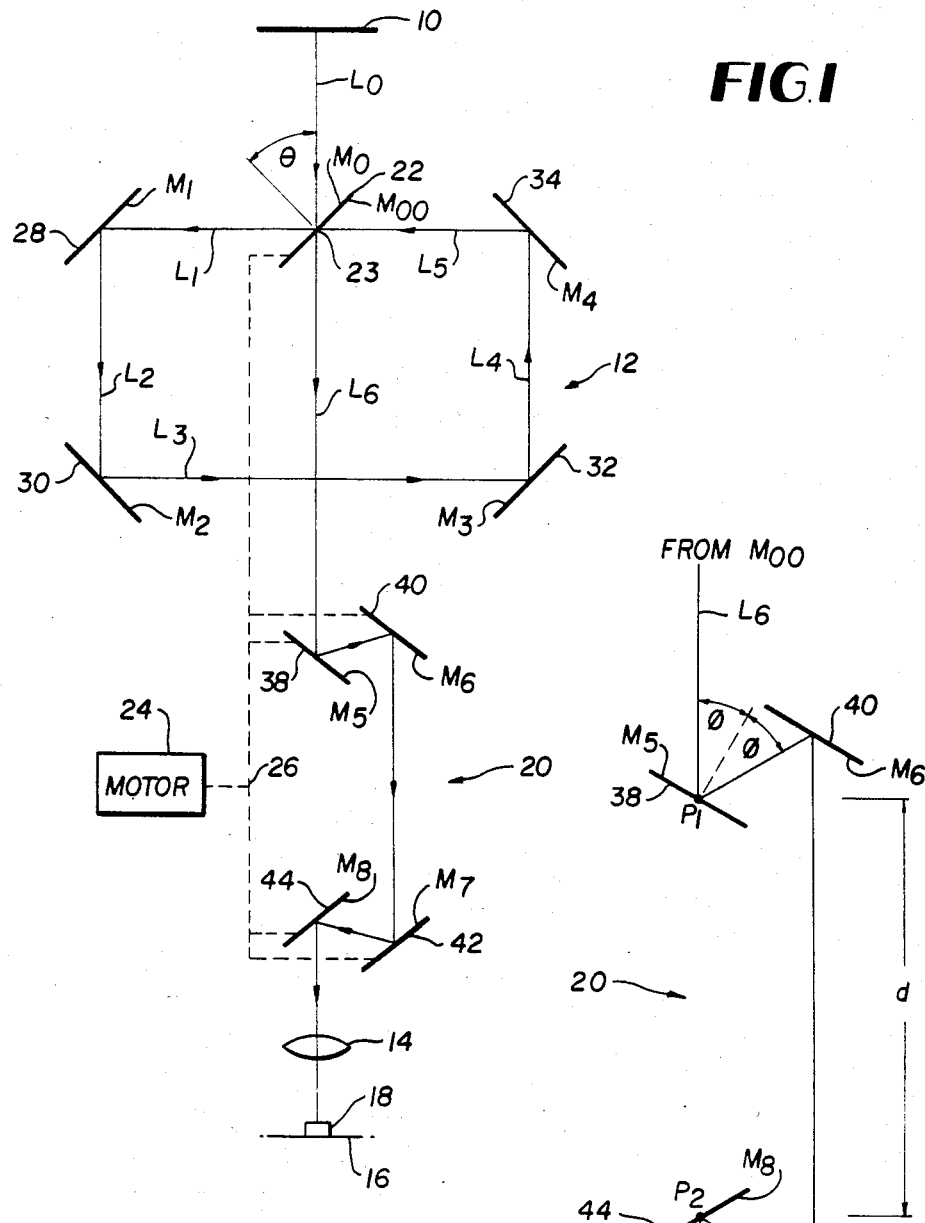
FIG. 1 is a schematic diagram illustrative of the preferred embodiment of the invention.
FIG. 5 is a schematic diagram further illustrative of the set of compensating mirrors included in the embodiment of the invention shown in FIG. 1.

Referring now to the drawings and more particularly to the schematic drawing of FIG. 1, the embodiment of the invention disclosed therein is comprised of an object plane 10 which contains the scene to be scanned, a scanning section 12, an imaging lens 14, and a focal plane 16 in which a linear array 18 with an arbitrary number of pixels, not shown, is located. An optional focal error compensating section 20 can be introduced between the scanning section 12 and the imaging lens 14.

The scanning section 12 is comprised of a plane parallel scanning mirror 22 with front and back reflecting surfaces $M_o$ and $M_{oo}$, respectively, and is rotated about a central vertical axis 23 by a scan motor 24 coupled thereto via a mechanical drive assembly shown schematically by reference numeral 26. The scanning mirror 22 also has a longitudinal axis, not illustrated. The scanning section 12 additionally includes a set of four mutually perpendicular corner mirrors 28, 30, 32 and 34 having plane reflecting surfaces $M_1$, $M_2$, $M_3$ and $M_4$.

Figure 2:
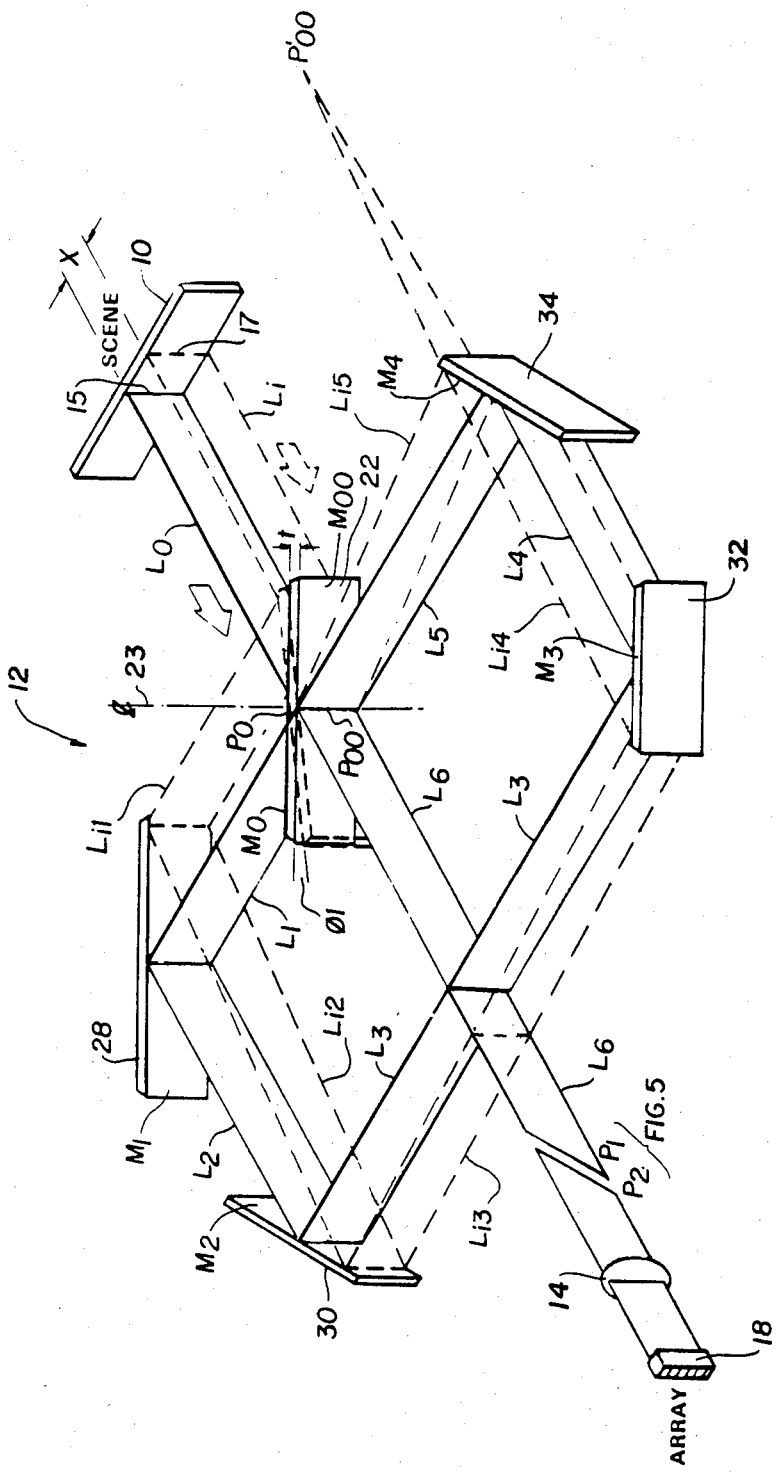
FIG. 2 is a perspective view further illustrative of the arrangement of the plane mirror configuration of the embodiment shown.

As further shown in FIG. 2, the scanning mirror 22 is located mid-way between the first and fourth corner mirrors 28 and 34 with the axis of rotation 23 being on a center line coincident with the midpoint of the two plane mirror surfaces $M_1$ and $M_4$ and about the mid point of the scan mirror 22.

For a relatively thin scan mirror 22, the center line on the front surface $M_o$ shall be referred to as $P_o$ and to the center line on the back surface $M_{oo}$ as $P_{oo}$. If the scanning mirror 22, moreover, is oriented such that the angle of incidence of the axial ray $L_o$, originating from line 15 in object plane 10, is at 45° with respect to the normal of the surface, $M_o$, then the incident ray $L_o$ will be reflected by the surface $M_o$ and directed to the first corner mirror 28 as ray $L_1$. This ray is subsequently reflected by the four corner mirrors 28, 30, 32 and 34 as ray $L_2$, $L_3$, $L_4$ and $L_5$ before being incident on surface $M_{oo}$ at $P_{oo}$. The rays $L_1$, $L_2$, $L_3$, $L_4$ and $L_5$ furthermore describe a parallelogram. The ray reflected by the surface $M_{oo}$, shown as ray $L_6$, is colinear with the incident ray $L_o$ since the angle of incidence on $M_o$ and $M_{oo}$ are the same. The imaging lens 14 merely focuses the ray $L_6$ onto the linear array 18.

Thus far only the axial ray $L_o$ and its rotational angle $\theta_o = \pi/4$ has been considered. In order to more fully understand the operation of the invention, a rotation of the scan mirror 22 must be considered. So that the rotational angle is incremented by $\theta_i$, as shown in FIG. 2, there is a ray $L_i$ originating from line 17 in plane 10, whose intersection on the surface $M_{oo}$ will coincide with the axial ray $L_o$ along the line $P_{oo}$, after traversing the corner mirrors with reflecting surfaces $M_1$, $M_2$, $M_3$ and $M_4$. This is shown in FIG. 2 by the broken lines. Tracing this arbitrary ray $L_i$ through the system reveals that $L_i$ left the object plane 10 parallel to $L_o$. Ray $L_i$ is reflected by scanning mirror 22 to first corner mirror 28, as shown by ray $L_{i1}$. Ray $L_{i1}$ is subsequently reflected by the four corner mirrors 28, 30, 32, and 34 as rays $L_{i2}$, $L_{i3}$, $L_{i4}$, and $L_{i5}$ before incident on surface $M_{oo}$ at $P_{oo}$. Now since $L_1$ must be parallel to $L_5$, $L_6$ must be parallel to $L_i$. The system effectively shifts all the incident rays $L_i$ on either side of $L_o$ so that they emerge colinearly as $L_6$. Each scan line, for example lines 15 and 17 (FIG. 2) are identified with a particular scan angle. It can be seen then that while the front reflecting surface $M_o$ of the scanning mirror 22 scans lines in the object plane 10, as shown in FIG. 2, the rear reflecting surface $M_{oo}$ descans a plurality of lines successively onto a linear array 18. The corner mirrors with reflecting surfaces $M_1$, $M_2$, $M_3$ and $M_4$ act as relays between the reflecting surfaces $M_o$ and $M_{oo}$ of the scanning mirror 22.

Figure 3:
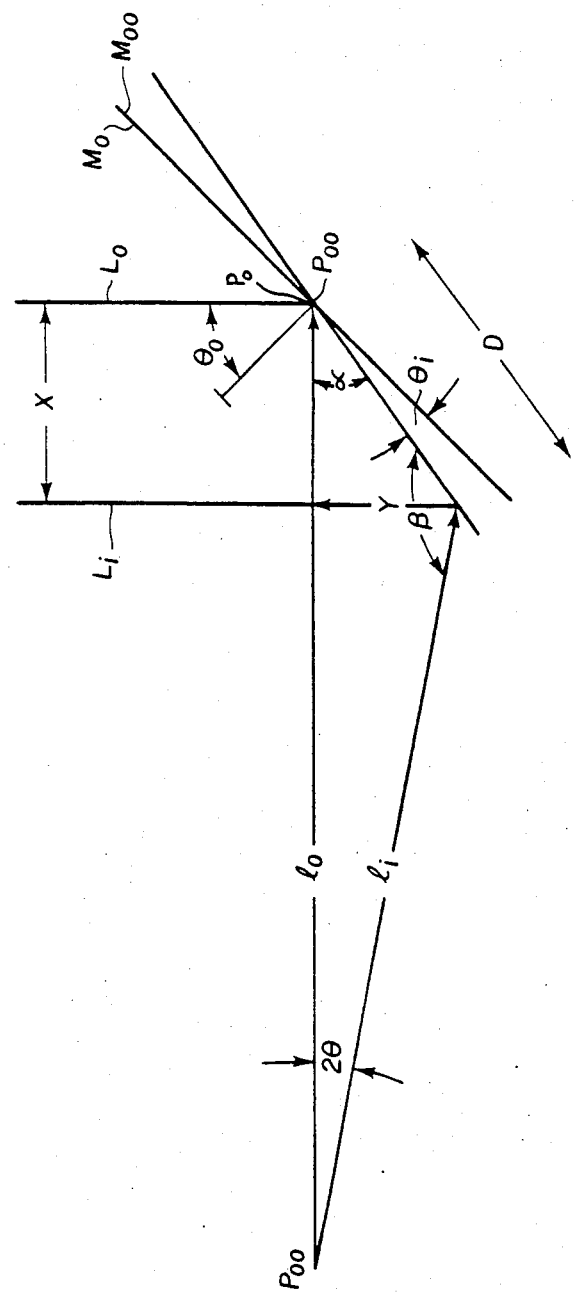
FIG. 3 is a ray diagram of the unfolded optical system of the invention as illustrated in FIG. 2.

An analysis of this operation can be simplified if the optical path is reversed and one considers a line source at $P_{oo}$ on $M_{oo}$. Next consider a scan mirror 22 with negligible thickness, t. Now rather than wander through the labyrinth of a formal ray trace, it need only be noted that the line source at $P_{oo}$ will be imaged as $P'_{oo}$ by the reflecting surface $M_4$ of the corner mirror 34. $P'_{oo}$ will in turn be imaged as $P''_{oo}$ by the third corner mirror 32 and so on through the system. Only $P'_{oo}$ is illustrated in FIG. 2, however. In any event, looking back through the system along the path followed by the ray $L_o$, the distances from the back surface $M_{oo}$ to the front surface $M_o$ of the scanning mirror 22 will appear to be at a distance $l_o$. Simultaneously, along the path followed by the ray $L_i$, the corresponding distance will be $l_i$. If one were to unfold the optical system of FIG. 2, it would appear schematically as shown in FIG. 3. Point $P_{oo}'$ in FIG. 3 represents point $P_{oo}$ unfolded.

Considering now FIG. 3, it can be seen that angles $\alpha$, $\beta$ and the distance Y can be expressed as:

$$\alpha = \pi/4 - \theta_i \quad (1)$$

$$\beta = \tfrac{3}{4}\pi - \theta_i \quad (2)$$

$$Y = \sin \alpha D \quad (3)$$

From the Law of Sines, one obtains the expression:

$$l_i/\sin \alpha = l_o/\sin \beta = D/\sin 2\theta_i \quad (4)$$

The path difference $\Delta_l$ between the axial ray $L_o$ and any marginal ray $L_i$ from the object plane 10 to the image lens 14 can be expressed as:

$$\Delta_l = l_o - (l_i + Y) \quad (5)$$

Substituting equations (1), (2), (3) and (4) into equation (5), it can be seen that for either a clockwise or counter clockwise rotation $$\Delta_l = 2l_o \sin^2 \theta_i \quad (6)$$

If the thickness, t, of the scan mirror cannot be neglected, the path difference becomes $$\Delta_l = 2l_o \sin^2 \theta_i - t[\sec \theta_o - \sec(\theta_o - \theta_i)](1 + \sin 2\theta_i) \quad (7)$$

for a clockwise rotation and $$\Delta_l = 2l_o \sin^2 \theta_i - t[\sec \theta_o - \sec(\theta_o + \theta_i)](1 - \sin 2\theta_i) \quad (8)$$

for a counter clockwise rotation.

Figure 4:
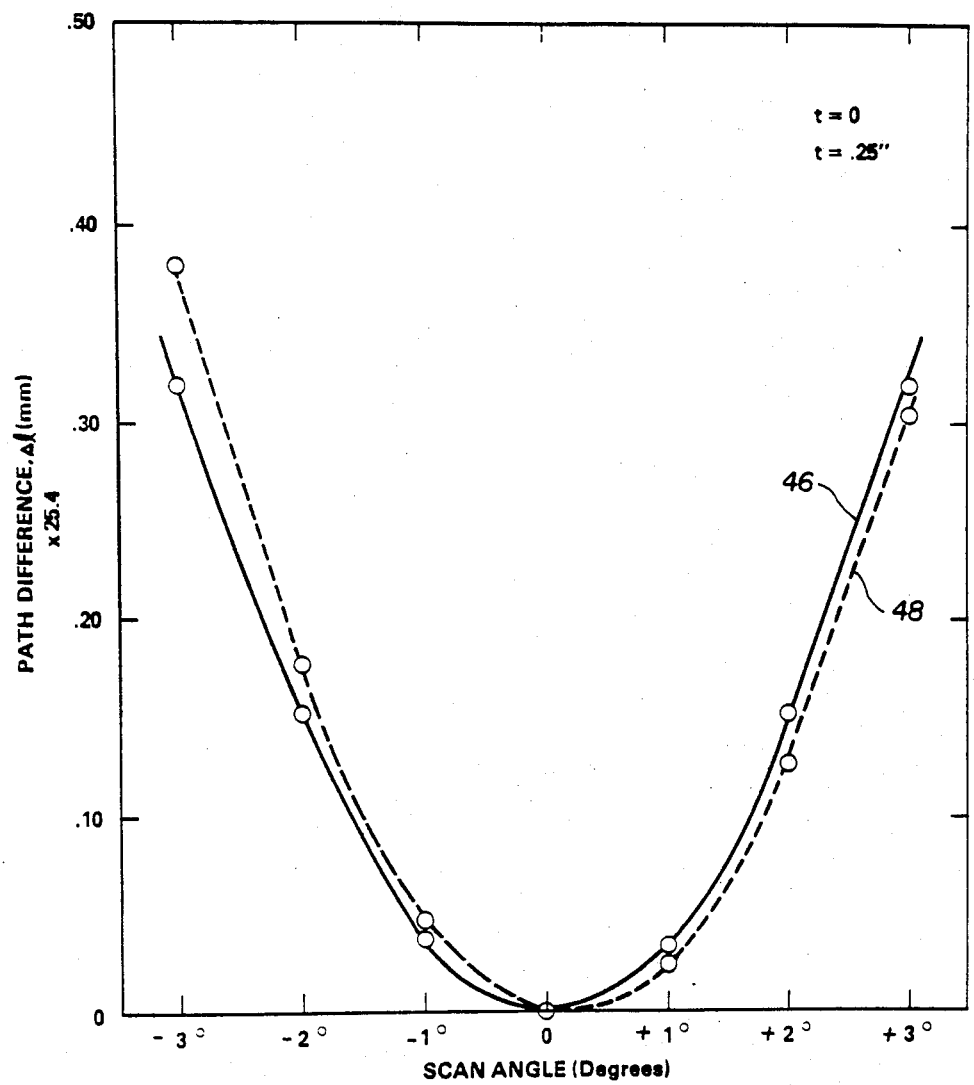
FIG. 4 is a plot of the path difference as a function of scan angle for two thicknesses(t) of the scan mirror.

It should be noted that the first term on the right side of equations (7) and (8) is concerned with the geometric path difference while the second term describes the projection of the scan mirror upon the optical path. For a relatively thin scan mirror 22, the second term should be negligible. A graph depicting this characteristic is further shown in FIG. 4 where the curve 46, for example, depicts the variation of path difference as a function of scan angle for a scanning mirror 22 having negligible thickness, i.e., $t=0$, while the graph 48 depicts this variation for a scanning mirror thickness $t=0.25$ inches. It is apparent from FIG. 4 that for scan angles other than $\theta_o = 45°$, which is associated with the axial ray $L_o$, there is a corresponding increase in the path difference $\Delta_l$. Generally, this difference can be ignored since it is well within the depth of field as described by Rayleigh's quarterwave criteria.

If it becomes desirable to cancel even this small path difference $\Delta_l$, it can be done by introducing a set of compensating mirrors as shown schematically in FIGS. 1 and 5. The set of compensating mirrors was referred to briefly above and is shown by reference numeral 20. The set of mirrors 20 is shown in FIG. 1 located between the scanning system 12 and the imaging lens 14 and is comprised of two complimentary sets of mirrors 38, 40 and 42, 44 separated by a distance d as shown in FIG. 5 and are arranged so that all the mirrors have the same angle of incidence, $\phi$.

The set of compensating mirrors are operated in pairs, i.e., mirrors 38 and 40 comprise a first pair of mirrors having mutually parallel flat reflecting surfaces $M_5$ and $M_6$ while the second pair of mirrors 42 and 44 have parallel reflecting surfaces $M_7$ and $M_8$. Both pairs of compensating mirrors 38, 40, 42 and 44, moreover, are mechanically coupled together and are rotated in tandem with the scanning mirror 22 by being mechanically coupled to the motor 24 by means of the drive mechanism 26.

With reference to FIG. 5, the path length from $P_1$ on surface $M_5$ of mirror 38 to $P_2$ on surface $M_8$ of mirror 44 can be continuously varied by incrementing the angle of incidence from some initial angle, $\phi_1$ to some final angle, $\phi_2$. Accordingly, the path length $\Delta_p$ from $P_1$ to $P_2$ can be continuously altered by, $$\Delta_p = 4d(\cos\phi_1 - \cos\phi_2) \quad (9)$$

By coupling the compensating mirrors 38, 40, 42, and 44 to the motor 24 as shown in FIG. 1, the path difference $\Delta_l$ between the axial ray $L_o$ and any arbitrary ray $L_i$ will go to zero if, $$\Delta_l + \Delta_p = 0 \quad (10)$$

As noted above, each line, e.g. lines 15 and 17, in the object plane 10 can be addressed in terms of the associated scan angle $\theta$. Accordingly and as shown in FIG. 2, the lateral distance X between the rays $L_o$ and $L_i$ can be expressed as:

$$X = l_o \sin 2\theta_i \quad (11)$$

Figure 6:
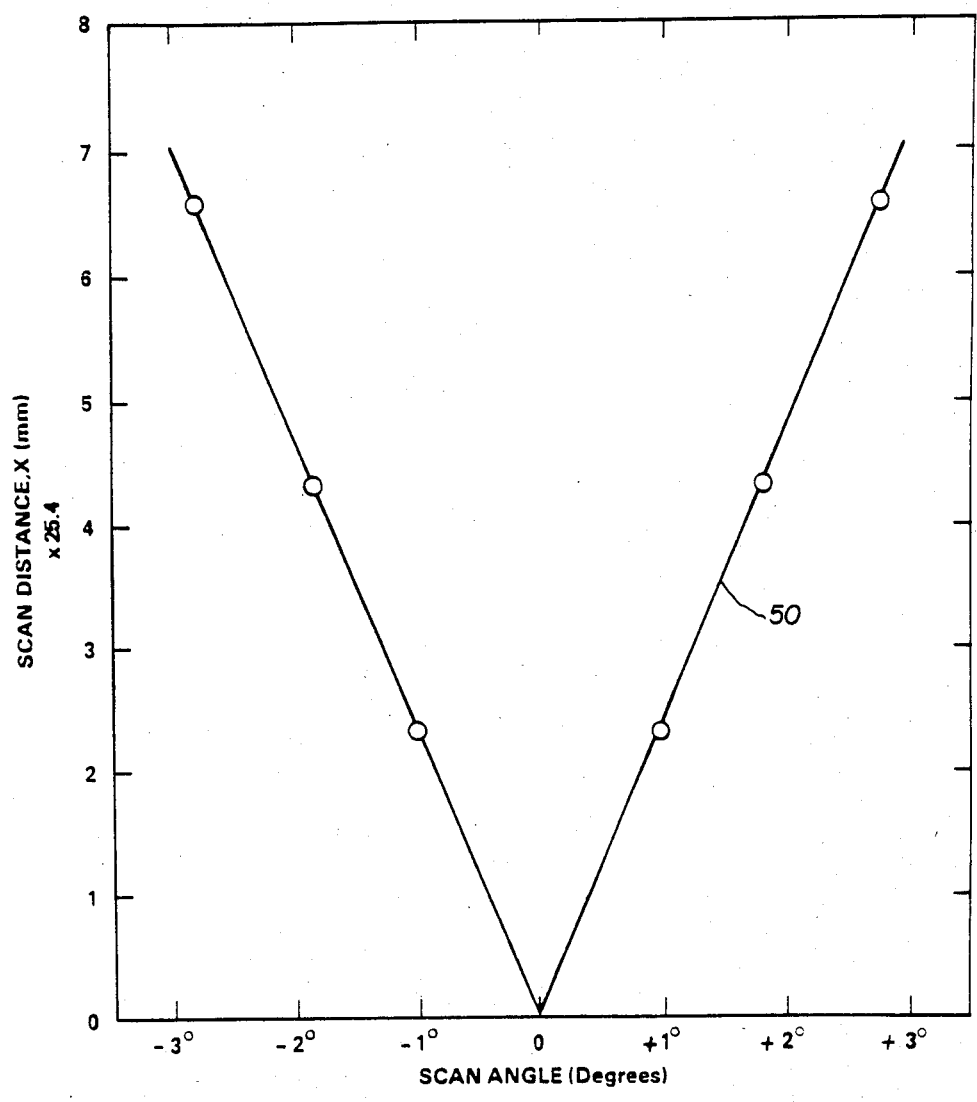
FIG. 6 is illustrative of the linearity and symmetry of the scanner as a function of scan angle.

Equation (11) holds for either a clockwise or counter-clockwise rotation providing the thickness of the scan mirror can be ignored. If the thickness of the mirror cannot be ignored, then equation (11) must be rewritten as:

$$X = l_o\sin 2\theta_i + \sqrt{2}t\,(\cos\theta_i + \sin\theta_i - 1)/(\cos\theta_i - \sin\theta_i) \quad (12)$$

for a clockwise rotation and $$X = l_o\sin 2\theta_i + \sqrt{2}t\,(\cos\theta_i - \sin\theta_i - 1)/(\cos\theta_i + \sin\theta_i) \quad (13)$$

for a counter clockwise rotation. Again for a relatively thin scan mirror 22, the first term on the right side of equations (12) and (13) will dominate. FIG. 6, moreover, discloses a plot of scan lines as a function of scan angle as shown by the curve 50 and indicates a linearity as well as the symmetry for small values of scanning mirror thickness t.

Typically, a scene or target in the object plane 10 is uniformly back illuminated by a diffuse source and in the preferred embodiment of the invention where all the optical surfaces are assumed to be locally flat to about a quarter wavelength, quarter inch plate glass has been found to be perfectly adequate for the scanning mirror 22 as well as the corner mirrors $M_1$, $M_2$, $M_3$ and $M_4$. Furthermore, in view of the subsequent demagnification any surface irregularities in the optical surfaces are inconsequential. As for scattering from the optical surfaces $M_1$, $M_2$, $M_3$, $M_4$, $M_o$ and $M_{oo}$, it should be noted that each pixel in the linear array 18 can only intercept that portion of the scattered light within its field of view. Consequently, only a small fraction of the total scattered light will be collected. It should also be noted that the consecutive angles of a parallelogram are supplementary which means that the angle of incidence on the corner mirrors 28, 30, 32 and 34 will alternate between $\pi/4 \pm 2\theta_i$. The reflectance of evaporated aluminum, in mirrors which have aluminum as the reflecting material, is almost monotonic around 45° so that for any given $\theta_i$ then the reflectance of each pair of corner mirrors should average out to the mean value at 45°. Reflection losses, at least for the corner mirrors, should therefore remain constant throughout the scan. One further comment about the optical system. The scanner only images the normal component of the scene's radiance. Hence the system is effectively immuned to radiometric errors such as the well known $\cos^4\theta$ fall off.

The optical system of this invention can be scaled for any given application. While the height of the scan mirror 22 and the corner mirrors 28, 30, 32 and 34 are determined by the scene being interrogated, the widths of each corner mirror need only subtend the full scan angle. The lens 14, depending upon the application, can simply be a camera lens, an enlarging lens or even a cylindrical lens.

The optical system terminates in the focal plane of the imaging lens 14 with a linear array 18. This linear array moreover can, when desirable, be mounted on a micropositioner with six degrees of freedom; however, the rotation of the scan mirror 22 about its axis 23 is the only motion required and depending upon the application, the rotation can be discrete or continuous.

Insofar as the scanning motor 24 shown in FIG. 1 is concerned, it typically comprises a miniature DC motor which directly drives a wheel unit which is coupled to a precision cam, not shown, which in turn drives a slide mechanism which imparts an oscillatory motion of, for example, ±5°. Although not germane to this application, the motor 24 has its shaft coupled to an optical encoder whose output serves to both stabilize the motor and clock data out of the array. Also an additional incremental encoder with an indexing pulse which is directly coupled to the scanning mirror 22 provides an independent indication of the scanner's position and provides a scan synchronous clock source for the array readout.

As an illustration, the linear array 18 includes 1728 elements on 15 micron centers where it is desired to scan and copy, for example, an 8 inch × 10 inch scene. To accommodate the 10 inch length, $l_o$ will be about 63 inches. The length of the array, $1728 \times 15\mu$ becomes approximately one inch. This would indicate an 8:1 reduction of the scene's height. If the pixel size is projected back onto the scene, it is found that $8 \times 15\mu = 0.10$ mm. which is just about the resolution limit of the human eye. If the read out time for a scan line is 1 ms, then in a little over two seconds the entire scene can be scanned.

Consider another example where it is desirable to develop a scanner for the determination of the well known modulation transfer function and it is decided that a standard 50 mm. USAF resolution test target will be used. In such a system the following approximation derived from equations (6) and (11) become helpful:

$$\Delta_l = X_m \theta_m \quad (14)$$

$$X_m = 2l_o \theta_m \quad (15)$$

where m refers to the marginal ray. As a rule of thumb, $l_o$ in such apparatus should be about $13X_m$, and since $X_m$ is 25 mm. for a 50 mm. target, $l_o$ should be about 325 mm. If the distance from the target 10 to the scan mirror 22 and from the scan mirror to the lens 14 is included, the total distance from target to line becomes about 500 mm. From equation (15) $\theta_m = 3.8 \times 10^{-2}$ and from equation (14) the maximum path difference $\Delta_l = 0.192$ mm. Assuming the lens 14 to be a 50 mm. enlarging lens optimized at 10:1 with a relative aperture of F/5.6, the maximum path difference $\Delta'_l$ across the focal plane becomes $1.92 \times 10^{-3}$ mm. since the longitudinal magnification is equal to the square of the lateral magnification. The depth of focus $\delta f$ according to the Rayleigh quarter-wave criterion can be expressed as:

$$\delta f \approx 2F^2 \lambda \quad (16)$$

Where, for example $\lambda = 0.5\mu$, then $\delta f = 31.4 \times 10^{-3}$ mm. This means that $\Delta'_l = 1.92 \times 10^{-3}$ mm. is well within the Rayleigh limit.

Having thus shown and described what is at present considered to be the preferred embodiment of the invention, it should be observed that the same has been made by way of illustration and not limitation. Accordingly, all modifications, alterations and changes coming within the spirit and scope of the invention as defined in the following claims are herein meant to be included.

I claim:

1. An optical scanner for scanning and imaging each line in a series of contiguous lines in an object plane onto an image plane comprising:

a set of mutually perpendicularly oriented corner mirrors having plane reflecting surfaces which provide a closed path describing a parallelogram;

a rotatable scanning mirror having a longitudinal axis and an axis of rotation with said axis of rotation being located at the midpoint of said longitudinal axis, and mutually parallel plane front and back reflecting surfaces;

said rotatable scanning mirror being located midway between the first and the last of said corner mirrors with said axis of rotation being on a line coincident with the midpoints of said first and said last of said corner mirrors;

said front reflecting surface of said rotatable scanning mirror being oriented so that incident rays of light from said object plane will be reflected toward the reflecting surface of said first corner mirror and said back reflecting surface of said rotatable scanning mirror being oriented so that rays of light incident from the reflecting surface of said last corner mirror will be directed toward said image plane;

said rotatable scanning mirror further being oriented so that the angle of incidence of the rays of light from said object plane on said front reflecting surface is equal to the angle of incidence of the rays of light from said last corner mirror on said back reflecting surface such that all rays of light incident from said object plane on said front reflecting surface are colinearly directed toward said image plane by said back reflecting surface and such that each line in said series of contiguous lines in said object plane is instantaneously scanned and imaged onto said image plane; and a lens located between said rotatable scanning mirror and said image plane for focusing the rays of light reflected by said back reflecting surface of said rotatably scanning mirror into a linear array located in said image plane.

2. The device of claim 1 further comprising means for rotating said rotatable scanning mirror.

3. The device of claim 1 wherein said set of mutually perpendicularly oriented corner mirrors comprises four mirrors.

4. The device of claim 1 wherein said rotatable scanning mirror comprises a relatively thin mirror.

5. The device of claim 1 further comprising means located between said rotatable scanning mirror and said lens for compensating for the thickness of said rotatable scanning mirror.

6. The device of claim 5 wherein said means for compensating for the thickness of said rotatable scanning mirror comprises a set of plane compensating mirrors arranged so that each reflecting surface of each of said set of plane compensating mirrors has the same angle of incidence for rays of light directed thereto.

7. The device of claim 6 wherein said set of plane compensating mirrors includes a first pair of mirrors and a second complementary pair of mirrors and wherein said pairs of mirrors are separated a predetermined distance apart.

8. The device of claim 7 wherein the reflecting surfaces of each mirror in each pair of mirrors are parallel to and face each other and wherein one reflecting surface of each pair of mirrors is respectively oriented so that rays of light reflected from said back reflecting surface of said rotatable scanning mirror and rays of light incident on said lens are colinear while the remaining two reflecting surfaces of said pairs of mirrors will direct rays of light parallel to the rays of light reflected from said back reflecting surface of said rotatable scanning mirror.

9. The device of claim 8 further comprising means for rotating said set of plane compensating mirrors in tandem with said rotatable scanning mirror.

* * * * *